United States Patent
Tang

(10) Patent No.: US 10,613,653 B2
(45) Date of Patent: Apr. 7, 2020

(54) DUAL-SIDED DISPLAY DEVICE

(71) Applicant: Wuhan China Star Optoelectronics Technology Co., Ltd., Wuhan, Hubei (CN)

(72) Inventor: Yuejun Tang, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 0 days.

(21) Appl. No.: 15/558,674

(22) PCT Filed: May 31, 2017

(86) PCT No.: PCT/CN2017/086735
§ 371 (c)(1),
(2) Date: Sep. 15, 2017

(87) PCT Pub. No.: WO2018/196093
PCT Pub. Date: Nov. 1, 2018

(65) Prior Publication Data
US 2018/0314354 A1    Nov. 1, 2018

(51) Int. Cl.
*G06F 3/041*    (2006.01)
*G09G 3/3208*    (2016.01)
(Continued)

(52) U.S. Cl.
CPC ............ *G06F 3/041* (2013.01); *G06F 1/1647* (2013.01); *G09G 3/20* (2013.01); *G09G 3/3208* (2013.01);
(Continued)

(58) Field of Classification Search
CPC ......... G09G 2300/02; G09G 2300/023; G09G 2300/026; G06F 3/041; G06F 3/0412; G06F 3/0414; G06F 3/0416; G06F 1/1647
(Continued)

(56) References Cited

U.S. PATENT DOCUMENTS 8,803,776 B2 * 8/2014 Saito .................... G02F 1/1345
345/1.1
2003/0210215 A1 * 11/2003 Takahashi ............ G06F 3/1431
345/87
(Continued)

FOREIGN PATENT DOCUMENTS

CN    1553252 A    12/2004
CN    1576980 A    2/2005
(Continued)

OTHER PUBLICATIONS

First Office Action of CN2017102899701.

*Primary Examiner* — Alexander Eisen
*Assistant Examiner* — Nelson Lam
(74) *Attorney, Agent, or Firm* — Andrew C. Cheng

(57) ABSTRACT

A dual-sided display device includes a first display panel having one side portion provided with a first solder pad; a second display panel arranged opposite to the first display panel and having one side portion provided with a second solder pad; and a flexible circuit board including an input end, a first output end, and a second output end. The first output end is electrically connected with the first solder pad. The second output end is electrically connected with the second solder pad. The input end receives an input signal. This structural arrangement helps lower down cost and make assembling and connection easy.

16 Claims, 8 Drawing Sheets

(51) Int. Cl.
*H04M 1/02* (2006.01)
*G06F 1/16* (2006.01)
*G09G 3/20* (2006.01)

(52) U.S. Cl.
CPC . *H04M 1/0266* (2013.01); *G06F 2203/04102* (2013.01); *G06F 2203/04103* (2013.01); *G09G 2300/0426* (2013.01); *H04M 1/0274* (2013.01)

(58) Field of Classification Search
USPC .................................................. 345/1.1–1.3
See application file for complete search history.

(56) References Cited

U.S. PATENT DOCUMENTS

| | | | | |
|---|---|---|---|---|
| 2004/0263759 | A1* | 12/2004 | Matsuhira | G02F 1/13452 349/151 |
| 2005/0088364 | A1* | 4/2005 | Matsuhira | G06F 3/1431 345/1.1 |
| 2005/0146486 | A1* | 7/2005 | Lim | G09G 3/3611 345/1.1 |
| 2005/0197165 | A1* | 9/2005 | Chen | H04M 1/0266 455/566 |
| 2005/0253773 | A1* | 11/2005 | Sekiguchi | G06F 3/1423 345/1.1 |
| 2006/0092095 | A1* | 5/2006 | Ming-Daw | G09G 3/20 345/1.3 |
| 2006/0230659 | A1* | 10/2006 | Hu | G09F 13/22 40/544 |
| 2007/0188406 | A1* | 8/2007 | Ma | G06F 3/1423 345/1.1 |
| 2008/0036692 | A1* | 2/2008 | Yun | G02F 1/13452 345/1.3 |
| 2008/0192037 | A1* | 8/2008 | Lee | G06F 3/1431 345/205 |
| 2008/0211732 | A1* | 9/2008 | Jung | G06F 3/1431 345/1.1 |
| 2015/0161928 | A1* | 6/2015 | Kim | G09G 3/20 345/1.3 |
| 2019/0221152 | A1* | 7/2019 | Park | G09G 3/2092 |

FOREIGN PATENT DOCUMENTS

| | | |
|---|---|---|
| CN | 201681587 U | 12/2010 |
| CN | 202183207 U | 4/2012 |
| CN | 103152893 A | 6/2013 |
| CN | 103886813 A | 6/2014 |
| CN | 105572986 A | 5/2016 |
| CN | 105589236 A | 5/2016 |
| CN | 105654858 A | 6/2016 |
| CN | 105932036 A | 9/2016 |
| CN | 205645817 U | 10/2016 |
| CN | 106409145 A | 2/2017 |
| CN | 106530991 A | 3/2017 |
| CN | 106601777 A | 4/2017 |
| CN | 206134157 U | 4/2017 |
| KR | 20040009101 A | 1/2004 |
| KR | 20140025231 A | 3/2014 |

* cited by examiner

DUAL-SIDED DISPLAY DEVICE

CROSS REFERENCE TO RELATED APPLICATIONS

This application claims the priority of Chinese Patent Application No. 2017102899970.1 filed on Apr. 27, 2017, titled "Dual-Sided Display Device", the disclosure of which is incorporated herein by reference in its entirety.

BACKGROUND OF THE INVENTION

1. Field of the Invention

The present invention relates to the field of display technology, and more particularly to a dual-sided display device.

2. The Related Arts

With the diversification of the needs for commercial display devices, the traditional one-sided display devices no longer suit such needs and dual-sided display devices are now emerging, where displayed contents on both sides are controllable to be identical or different by means of software writing.

A conventional dual-sided display device comprises a first display panel and a second display panel. The first display panel and the second display panel are arranged opposite to each other. The first display panel is provided with a first solder pad on a lower part thereof, and the second display panel is provided with a second solder pad on a lower part thereof. The dual-sided display device further comprises a first circuit board and a second circuit board. The first circuit board is provided with a first input port and a first output port, and the second circuit board is provided with a second input port and a second output port. The first output port is connectable to the first solder pad, and the second output port is connectable to the second solder pad. The first input port and the second input port are connectable to and receive an input signal. The input signal can be for example an image signal, a video signal, and an audio signal, and the likes. However, since the first circuit board and the second circuit board are two independent circuit boards, the costs are high and installation is complicated. Further, the first circuit board and the second circuit board are respectively provided with the first input port and the second input port, mounting the ports is also complicated.

SUMMARY OF THE INVENTION

The technical issue that an embodiment of the present invention is made for is to provide a dual-sided display device, which has a low cost and is easy to assemble.

To resolve the above issue, the present invention provides a dual-sided display device, which comprises:

a first display panel, which is provided on a side portion thereof with a first solder pad;

a second display panel, which is arranged opposite to the first display panel and is provided on a side portion thereof with a second solder pad; and a flexible circuit board, which comprises an input end, a first output end, and a second output end, wherein the first output end is electrically connectable with the first solder pad; the second output end is electrically connectable with the second solder pad; and the input end receives an input signal.

In the above device, the flexible circuit board is configured as a Y-shape and the flexible circuit board comprises a first branch board, a second branch board, and a third branch board, wherein the first output end is arranged on the first branch board; the second output end is arranged on the second branch board; the input end is arranged on the third branch board, and the first branch board and the second branch board re arranged on the same side, while the third branch board on an opposite side.

The present invention also provides an application terminal device, which comprises the above dual-sided display device.

Embodiments of the present invention provides the following advantages:

(1) The dual-sided display device comprises a first display panel, a second display panel, and a flexible circuit board, wherein the first display panel and the second display panel are respectively and electrically connectable with a first output end and a second output end of the flexible circuit board to allow signals fed to the first display panel and the second display panel to be supplied through an input end of the flexible circuit board so as to simplify the connection and assembling is also made easy. Further, the dual-sided display device requires just one flexible circuit board, so that the cost can be lowered down and the assembling of the flexible circuit board is also made easy.

(2) Since the dual-sided display device comprises a common driver chip and the common driver chip is operable to drive the first display panel and the second display panel and the common driver chip is arranged on the first branch board or the second branch board or the third branch board. Thus, only one driver chip is required so as to save driver chips to thereby lower down cost.

BRIEF DESCRIPTION OF THE DRAWINGS

To more clearly explain the technical solution proposed in an embodiment of the present invention or that of the prior art, a brief description to the drawings that are necessary for describing the embodiment or the prior art is given as follows. It is obvious that the drawings that will be described below show only some embodiments of this application. For those having ordinary skills of the art, other illustrations may be readily available from these attached drawings without the expense of creative effort and endeavor.

DETAILED DESCRIPTION OF THE PREFERRED EMBODIMENTS

A clear and complete description will be given to technical solutions provided by embodiments of the present invention with reference to the attached drawings of the embodiments of the present invention. However, the embodiments so described are only some, but not all, of the embodiments of the present invention. Other embodiments that are available to those having ordinary skills of the art without the expense of creative effort and endeavor are considered belonging to the scope of protection of the present invention.

Terms, such as "comprising" and "having", as well as any variations thereof, appearing in the specification, the claims, and the drawings of this application are intended to cover non-exclusive inclusion. For example, a process, a method, a system, a product, or a device that comprises a series of steps or units is not constrained to include only the steps or units that are listed and may optionally include any other steps or units that have not been listed, or may optionally include other steps or units inherently involved in the process, method, product, or device. Further, terms, such as "first", "second" and "third", are used to distinguish different subjects and are not intended to exactly describe a specific sequential arrangement.

First Embodiment

Figure 1:
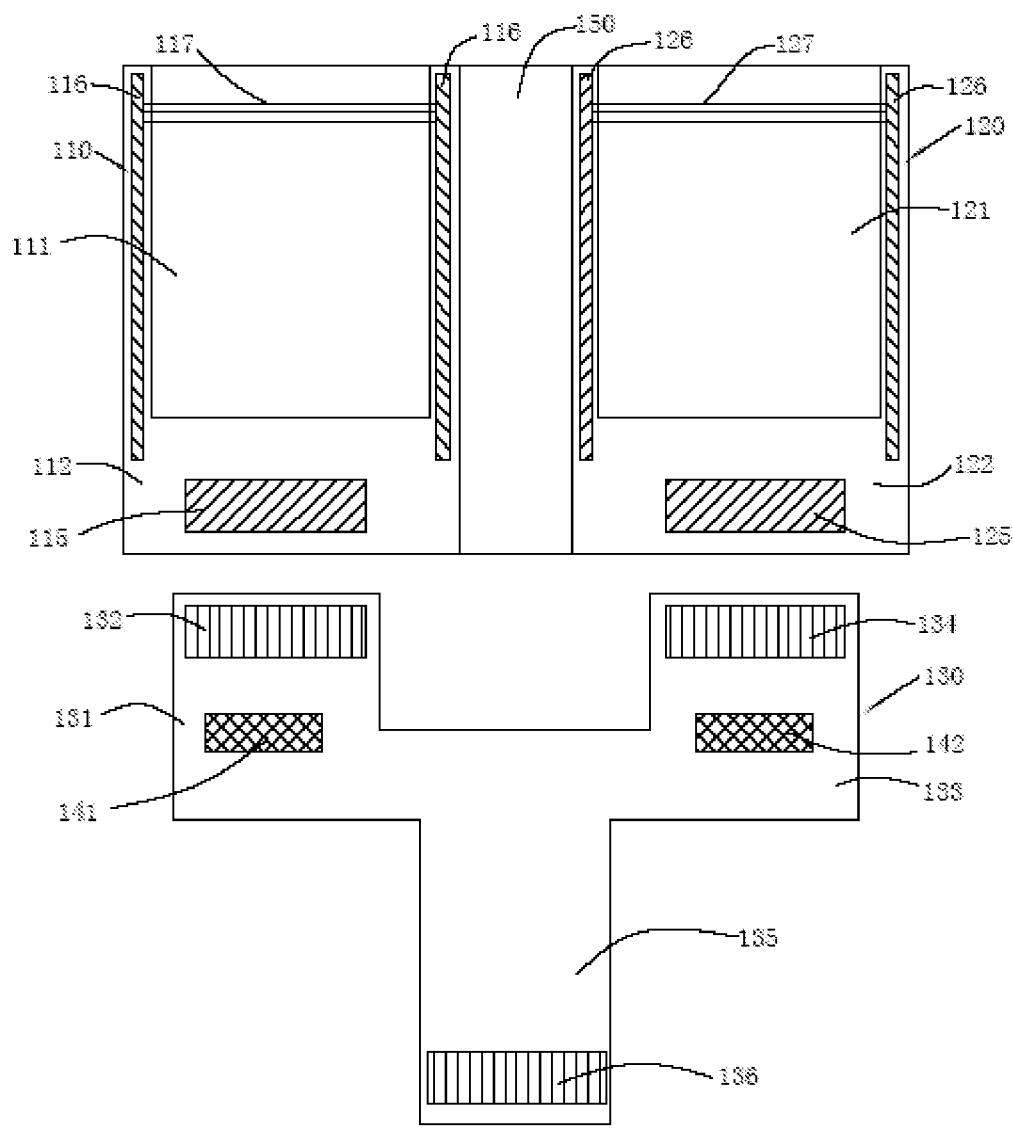
FIG. 1 is a developed plan view of a dual-sided display device according to a first embodiment of the present invention (where a first display panel, a second display panel, and a flexible circuit board being shown in an exploded fashion)
Figure 2:
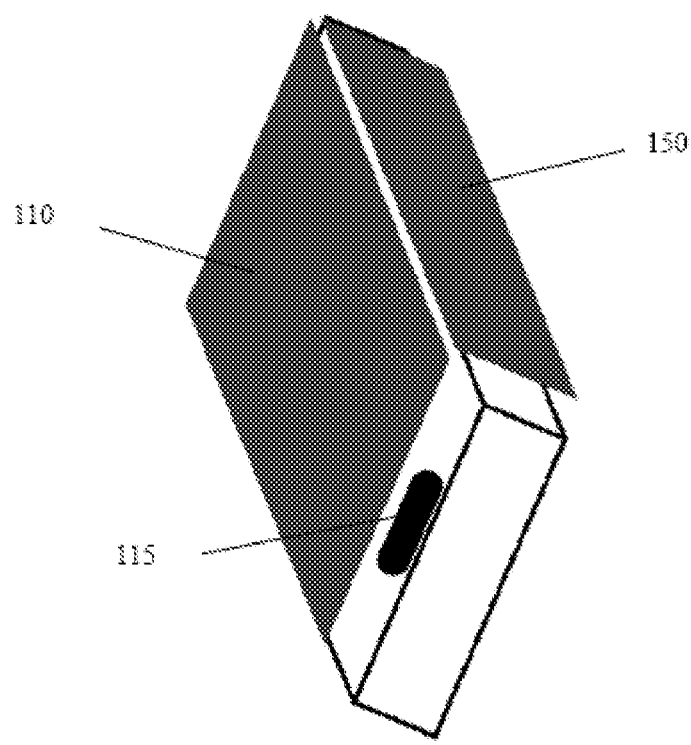
FIG. 2 is a perspective view illustrating a part structure of the dual-sided display device of the first embodiment of the present invention.
Figure 3:
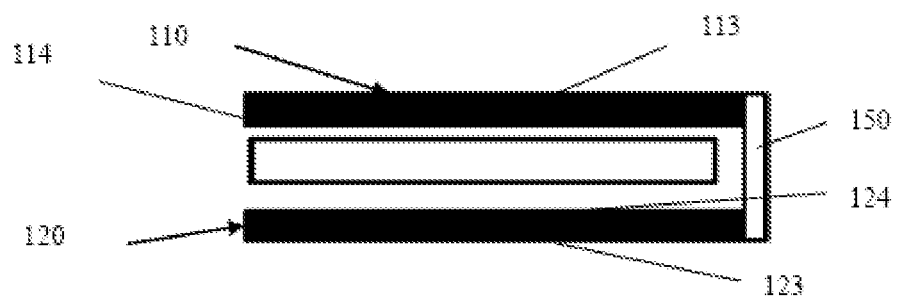
FIG. 3 is a cross-sectional view illustrating a part structure of the dual-sided display device of the first embodiment of the present invention.

An embodiment of the present invention provides a dual-sided display device. As shown in FIGS. 1-3, the dual-sided display device comprises a first display panel 110, a second display panel 120, and a flexible circuit board 130. The first display panel 110 is provided for front-side displaying, while the second display panel 120 is for back-side displaying. The first display panel 110 comprises a first display zone 111 and a first non-display zone 112; and the second display panel 120 comprises a second display zone 121 and a second non-display zone 122. The first display zone 111 and the second display zone 121 are provided for displaying, while the first non-display zone 112 and the second non-display zone 122 are provided for installation of chips, driver circuits, and solder pads thereon. In the instant embodiment, the first display panel 110 and the second display panel 120 are both organic light-emitting diode (OLED) display panels. Further, in other embodiments of the present invention, the first display panel and the second display panel can be liquid crystal display panels or other type regular display panels, or alternatively, the first display panel is a crystal display panel and the second display panel is an OLED display panel, or vice versa, or various combinations thereof with other types of regular display panels.

In the instant embodiment, the first display panel 110 comprises a first displaying surface 113 and a first back-side surface 114. The first displaying surface 113 is the surface that a viewer watches. The first back-side surface 114 is arranged adjacent to the second display panel 120. The first displaying surface 113 and the first back-side surface 114 are arranged opposite to each other. The first display panel 110 comprises a first solder pad 115, wherein the first solder pad 115 is provided for signal connection with other ports or connectors. The first solder pad 115 comprises first pins. The second display panel 120 comprises a second displaying surface 123 and a second back-side surface 124. The second displaying surface 123 is the surface that a viewer watches. The second back-side surface 124 is arranged adjacent to the first display panel 110. The second displaying surface 123 and the second back-side surface 124 are arranged opposite to each other. The second display panel 120 and the first display panel 110 are arranged opposite to each other, and thus, the first back-side surface 114 and the second back-side surface 124 are opposite to each other. The first displaying surface 113 and the second displaying surface 123 are provided for observation by the viewer. The second display panel 120 comprises a second solder pad 125, wherein the second solder pad 125 is provided for signal connection with other ports or connectors. The second solder pad 125 comprises second pins.

The flexible circuit board 130 comprises an input end 136, a first output end 132, and a second output end 134. The first output end 132 is electrically connected to the first solder pad 115, and the second output end 134 is electrically connected to the second solder pad 125. The input end 136 receives an input signal.

Specifically, the first output end 132 comprises first output pins, wherein the first output pins are compatible with and mateable with the first pins of the first solder pad 115 such that the first output pins are electrically connectable with the first pins to allow a signal from the first output end 132 to be transmitted to the first solder pad 115. The second output end 134 comprises second output pins, wherein the second output pins are compatible with and mateable with the second pins of the second solder pad 125 的 the second pins such that the second output pins are electrically connectable with the second pins to allow a signal from the second output end 134 to be transmitted to the second solder pad 125. Further, in other embodiments of the present invention, the first output end may not comprise the first output pins, and the second output end may not comprise the second output pins; the first output end comprises first output gold fingers, wherein the first output gold fingers are compatible with and mateable with the first pins of the first solder pad such that the first output gold fingers are electrically connectable with the first pins; and the second output end comprises second output gold fingers, wherein the second output gold fingers are compatible with and mateable with the second pins of the second solder pad such that the second output gold fingers are electrically connectable with the second pins. In the instant embodiment, the input end 136 is provided for connection with an input signal, wherein the input signal can be for example a video signal, an image signal, an audio signal, and the likes, wherein the input signal that is received by the input end 136 is supplied to the first output end 132 and the second output end 134. The input end 136 is made to have a configuration and electrical contact pins that are compatible with and mateable with an external connector.

In the instant embodiment, the dual-sided display device comprises the first display panel 110, the second display panel 120, and the flexible circuit board 130, wherein the first display panel 110 and the second display panel 120 are respectively and electrically connected with the first output end 132 and the second output end 134 of the flexible circuit board 130 so that signals to be supplied to the first display panel 110 and the second display panel 120 are all received through the input end 136 of the flexible circuit board 130, such that one single input end 136 is provided on the flexible circuit board 130 to be shared by both. Thus, assembling connection is made simple. Further, the dual-sided display device involves just one flexible circuit board 130, so that the cost can be lowered down and the assembling of the flexible circuit board 130 is easy.

In the instant embodiment, the flexible circuit board 130 is of a Y-shape. The flexible circuit board 130 comprises a first branch board 131, a second branch board 133, and a third branch board 135. The first branch board 131, the second branch board 133, and the third branch board 135 are each in the form of an elongate strip or other shapes and the three branch boards are respectively arranged at three branches of the Y-shaped configuration of the flexible circuit board 130, where the first branch board 131 and the second branch board 133 are arranged on the same side and are located on an upper side in the instant embodiment, while the third branch board 135 is arranged on an opposite side and is located on a lower side in the instant embodiment. The first output end 132 is provided on the first branch board 131; the second output end 134 is provided on the second branch board 133; and the input end 136 is provided on the third branch board 135. With the flexible circuit board 130 being configured as a Y-shape, the input end 136 can be shared so that the cost of the flexible circuit board 130 can be reduced. Further, in other embodiments of the present invention, the arrangements of the first output end, the second output end, and the input end on the first branch board, the second branch board, and the third branch board can be made in different ways, provided the first output end, the second output end, and the input end are each individually arranged on each one of the branches.

Figure 4:
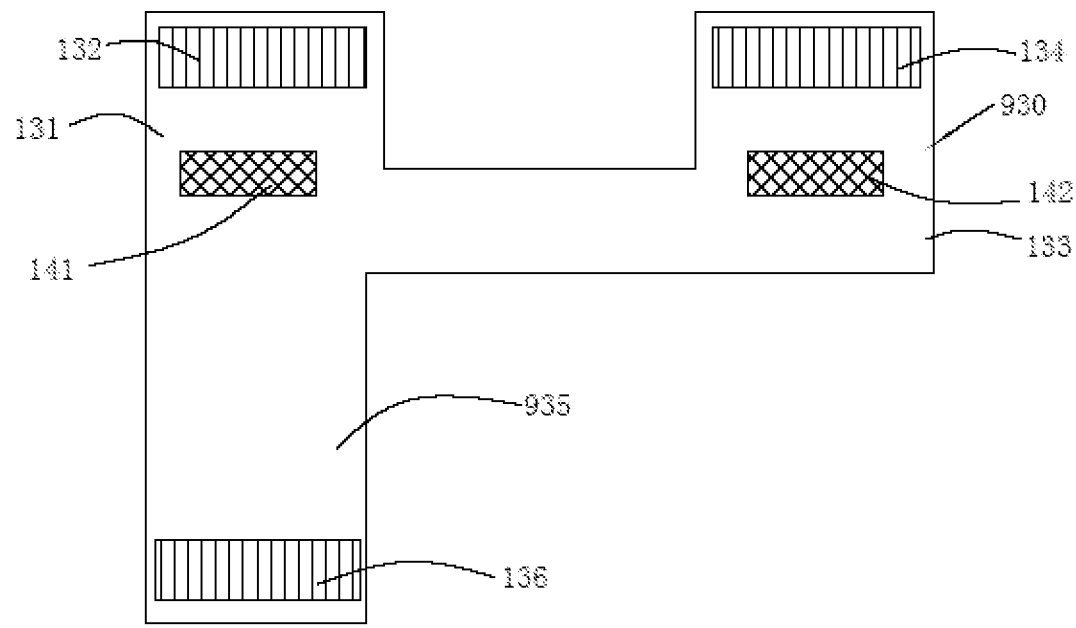
FIG. 4 is a plan view illustrating a flexible circuit board according to an embodiment of the present invention.
Figure 5:
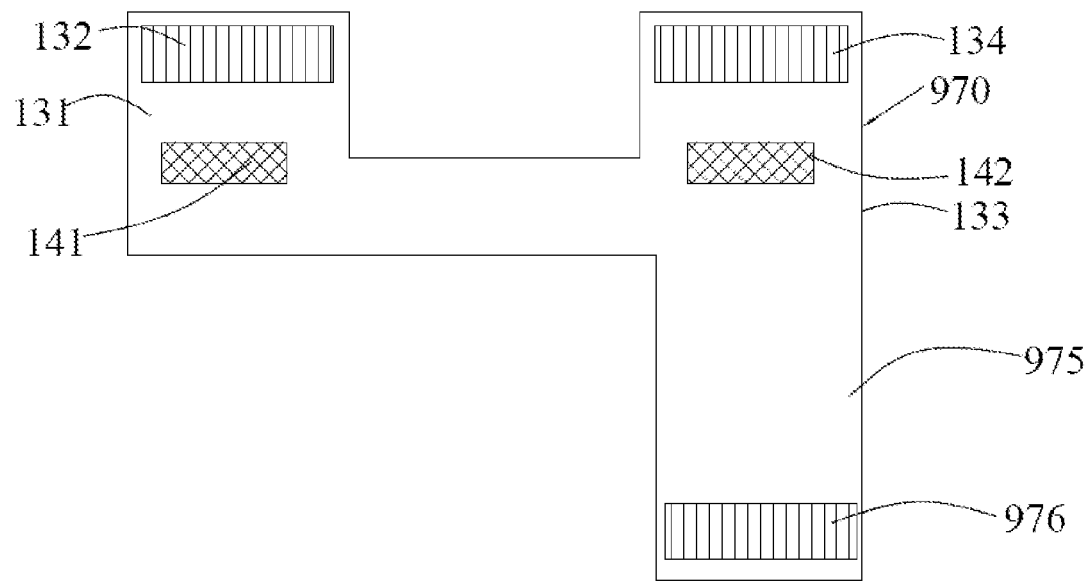
FIG. 5 is a plan view illustrating a flexible circuit board according to another embodiment of the present invention.

In the instant embodiment, the third branch board 135 is located between the first branch board 131 and the second branch board 133. For example, the first branch board 131 is set at a leftmost position, the third branch board 135 at a middle position, namely a position on a central axis between the first branch board 131 and the second branch board 133, and the second branch board 133 is at a rightmost position. However, the present invention is not limited to such an arrangement and in other embodiments of the present invention, as shown in FIG. 4, the third branch board 935 and the first branch board 131 are arranged on a common vertical line. Further, in other embodiments of the present invention, as shown in FIG. 5, the third branch board 975 and the second branch board 133 are arranged on a common vertical line.

In the instant embodiment, the side of the first display panel 110 that is provided with the first solder pad 115 and the side of the second display panel 120 that is provided with the second solder pad 125 are flush with each other, as shown in FIG. 1, meaning the lower side of the first display panel 110 and the lower side of the second display panel 120 are substantially flush with each other. In the instant embodiment, the first display panel 110 and the second display panel 120 have surface areas that are identical and an upper side of the first display panel 110 and an upper side of the second display panel 120 are substantially flush with each other. One side of the first solder pad 115 that is adjacent to the first branch board 131 and one side of the second solder pad 125 that is adjacent to the second branch board 133 are substantially flush with each other, meaning, in the instant embodiment, a lower side of the first solder pad 115 and a lower side of the second solder pad 125 are substantially flush with each other. In the instant embodiment, a location of the first solder pad 115 on the first display panel 110 corresponds to a location of the second solder pad 125 on the second display panel 120. In the instant embodiment, one side of the first branch board 131 that is adjacent to the first solder pad 115 and one side of the second branch board 133 that is adjacent to the second solder pad 125 are substantially flush with each other, meaning an upper side of the first branch board 131 and an upper side of the second branch board 133 are substantially flush with each other.

To drive the first display panel 110 and the second display panel 120, the dual-sided display device comprises a first driver chip 141 and a second driver chip 142, wherein the first driver chip 141 is operable to drive the first display panel 110 and the second driver chip 142 is operable to drive the second display panel 120. In the instant embodiment, the first driver chip 141 is arranged on the first branch board 131 (by adopting a COF (Chip on Film) package) and the second driver chip 142 is arranged on the second branch board 133 (by adopting a COF package) so that the first driver chip 141 and the second driver chip 142 can be mounted on the flexible circuit board 130 to establish electrical connection, by way of the flexible circuit board 130, with the first display panel 110 and the second display panel 120 to allow the first driver chip 141 and the second driver chip 142 to respectively drive the first display panel 110 and the second display panel 120; the installation is simple and easy. Further, in other embodiments of the present invention, the first driver chip and the second driver chip may alternatively be arranged such that one is located on the flexible circuit board, while the other one is located on the first display panel or the second display panel.

In the instant embodiment, referring to FIGS. 1-3, the dual-sided display device further comprises a bent section 150, wherein the bent section 150 is arranged between the first display panel 110 and the second display panel 120 and the bent section 150 is arranged vertical, while the first display panel 110 and the second display panel 120 are arranged horizontal. In the instant embodiment, the bent section 150, the first display panel 110, and the second display panel 120 share one common flexible substrate. The flexible substrate can be made of any suitable insulation material showing flexibility, such as polyimide (PI), polycarbonate (PC), polyestersulfone (PES), polyethylene terephthalate (PET), poly ethylene naphthalate (PEN), polyarylate (PAR), and fiber reinforced plastics (FRP). Since the flexible substrate is bendable, bending the flexible substrate may form the bent section 150, a part of the first display panel 110, and a part of the second display panel 120 so that the bent section can be made small without unnecessary cutting thereby helping increase production efficiency. Further, in the instant embodiment, the bent section 150 is formed by being bent by 180° for one time, but this invention is not limited thereto and in other embodiments of the present invention, the bent section 150 can be formed through two bending operations each bending by 90°, or a stepwise bending operation may be employed for bending through multiple steps to achieve 180-degree bending. Further, in other embodiments of the present invention, the first display panel may comprise a first substrate and the second display panel 120 may comprise a second substrate, while the bent section comprises a bendable substrate, wherein the first substrate, the second substrate, and the bendable substrate are collectively one common glass substrate, where the glass substrate is bent in a condition of high temperature to form the first substrate, the second substrate, and the bendable substrate. Further, in other embodiments of the present invention, the first display panel comprises a first substrate; the second display panel comprises a second substrate; and the bent section comprises a bendable substrate, wherein the first substrate and the second substrate are glass substrates, while the bendable substrate comprises a flexible substrate, where the flexible substrate is bendable to connect with the first substrate and the second substrate.

Figure 11:
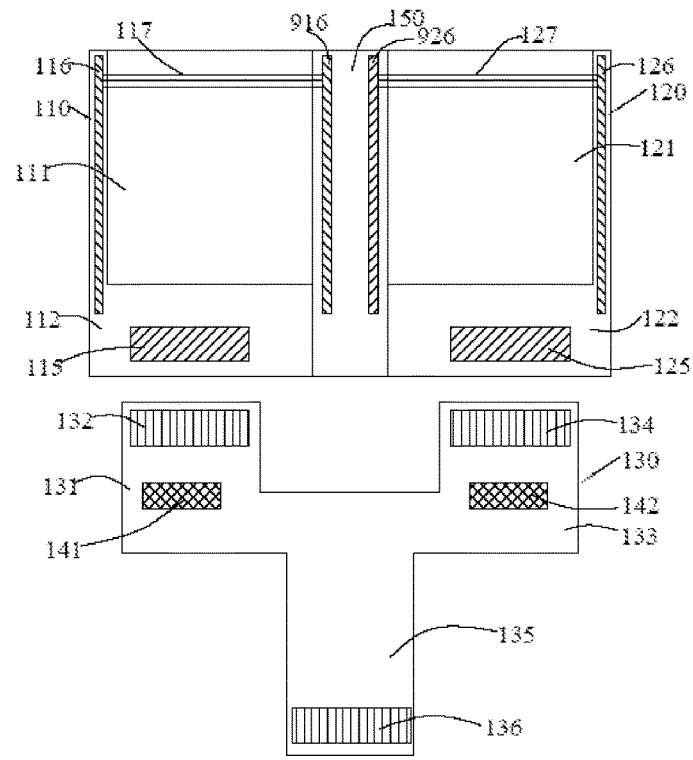
FIG. 11 is a developed plan view of a dual-sided display device according to an embodiment of the present invention.

In the instant embodiment, the dual-sided display device comprises two first gate driver circuits 116, and two first gate driver circuits 116 are operable to drive the first display panel 110. The two first gate driver circuits 116 are respectively located on left and right side portions of the first display panel 110. First scan lines 117 are provided between the two first gate driver circuits 116. Further, in other embodiments of the present invention, as shown in FIG. 11, one of the first gate driver circuits 916 is arranged on the bent section 150, while the other one of the first gate driver circuits 116 is located on one side portion of the first display panel 110 that is distant from the bent section 150. Since one of the first gate driver circuits 916 is located on the bent section 150, a width of an outer frame of the first display panel 110 can be reduced to facilitate frame narrowing and help expand an area of a displaying zone of the first display panel 110.

In the instant embodiment, the dual-sided display device comprises two second gate driver circuits 126, and the two second gate driver circuits 126 are operable to drive the second display panel 120. The two second gate driver circuits 126 are respectively located on left and right side portions of the second display panel 120. Second scan lines 127 are provided between the two second gate driver circuits 126. Further, in other embodiments of the present invention, as shown in FIG. 11, one of the second gate driver circuits 926 is arranged on the bent section 150, while the other one of the second gate driver circuits 126 is located on one side portion of the second display panel 120 that is distant from the bent section 150. Since one of the second gate driver circuits 926 is located on the bent section 150, a width of an outer frame of the second display panel 110 can be reduced to facilitate frame narrowing and help expand an area of a displaying zone of the second display panel 120.

Further, an embodiment of the present invention further provides an application terminal device that comprises the dual-sided display device according to the first embodiment, and the application terminal device can be for example a mobile phone and the likes. Specifically, the application terminal device comprises the dual-sided display device, and the dual-sided display device comprises a first display panel, a second display panel, and a flexible circuit board, wherein the first display panel is provided on one side portion thereof with a first solder pad; the second display panel is arranged opposite to the first display panel and the second display panel is provided on one side portion thereof with a second solder pad; the flexible circuit board comprises an input end, a first output end, and a second output end, wherein the first output end is electrically connected with the first solder pad; the second output end is electrically connected with the second solder pad; and the input end is provided for receiving an input signal. Further, the first display panel and the second display panel are arranged to have a space provided therebetween to receive other components of the application terminal device arranged therein. Further, in other embodiments of the present invention, the application terminal device may comprise a dual-sided display device according to second to tenth embodiments provided below and repeated description will be omitted here.

Second Embodiment

Figure 6:
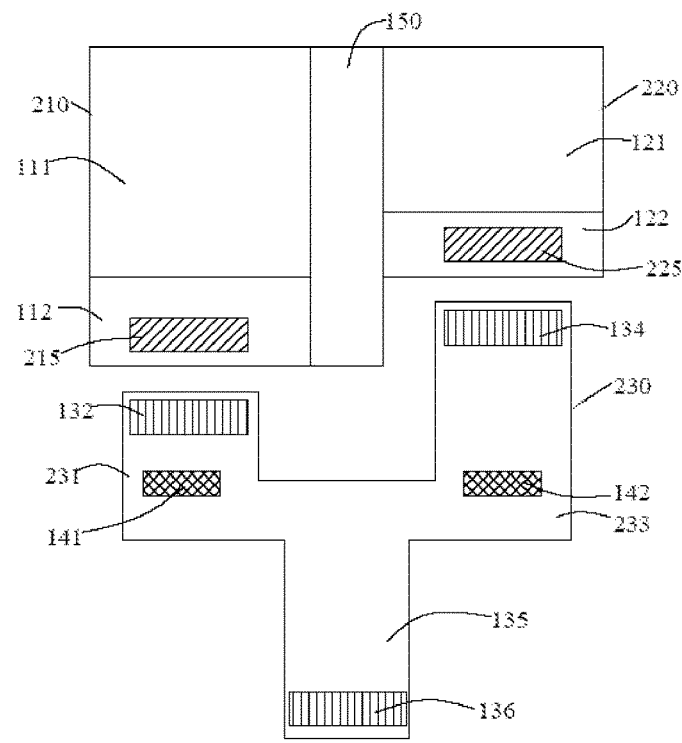
FIG. 6 is a developed plan view of a dual-sided display device according to a second embodiment of the present invention.

FIG. 6 shows a dual-sided display device provided according to a second embodiment of the present invention. FIG. 6 provides a structure that is similar to that illustrated in FIG. 1 and thus, similar parts are designated with same reference characters. A major difference of the instant embodiment from the first embodiment is that the first solder pad and the second solder pad are not arranged at locations to be substantially flush with each other.

In the instant embodiment, as shown in FIG. 6, a side portion of a first display panel 210 that is provided with a first solder pad 215 is not substantially flush with a side portion of a second display panel 220 that is provided with a second solder pad 225 in order to suit different functional needs. Here, the side portion of the first display panel 210 that is provided with the first solder pad 215 is distant from an input end 136 by a distance that is smaller than a distance of the side portion of the second display panel 220 that is provided with the second solder pad 225 from the input end 136, meaning a lower side of the first display panel 210 is located lower than a lower side of the second display panel 220 so that a distance of the first solder pad 215 from the input end 136 is smaller than a distance of the second solder pad 225 from the input end 136. To allow for electrical connection between the flexible circuit board 230 and the first and second display panels 210, 220, a distance between a side of a first branch board 231 that is distant from the input end 136 and the input end 136 is smaller than a distance between a side of a second branch board 233 that is distant from the input end 136 and the input end 136, meaning an upper end of the second branch board 233 is located higher than an upper end of the first branch board 231; and similarly, a second input end 134 is located higher than a first input end 132.

Third Embodiment

Figure 7:
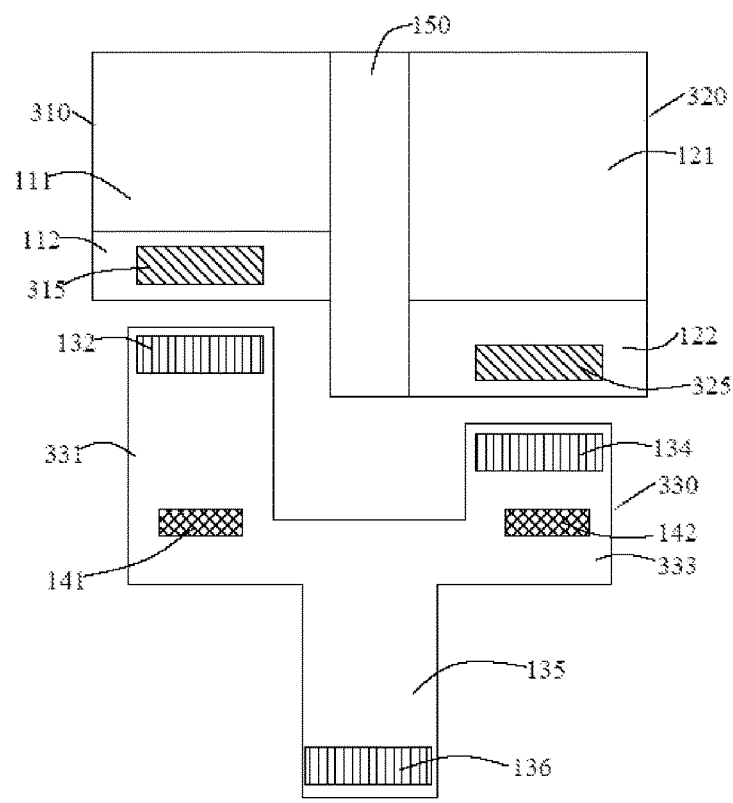
FIG. 7 is a developed plan view of a dual-sided display device according to a third embodiment of the present invention.

FIG. 7 shows a dual-sided display device provided according to a third embodiment of the present invention. FIG. 7 provides a structure that is similar to that illustrated in FIG. 1 and thus, similar parts are designated with same reference characters. A major difference of the instant embodiment from the first embodiment is that the first solder pad and the second solder pad are not arranged at locations to be substantially flush with each other.

In the instant embodiment, as shown in FIG. 7, a side portion of a first display panel 310 that is provided with a first solder pad 315 is not substantially flush with a side portion of a second display panel 320 that is provided with a second solder pad 325 in order to suit different functional needs. Here, the side portion of the first display panel 310 that is provided with the first solder pad 315 is distant from an input end 136 by a distance that is larger than a distance of the side portion of the second display panel 320 that is provided with the second solder pad 325 from the input end 136, meaning a lower side of the first display panel 310 is located upper than a lower side of the second display panel 320 so that a distance of the first solder pad 315 from the input end 136 is larger than a distance of the second solder pad 325 from the input end 136. To allow for electrical connection between the flexible circuit board 330 and the first and second display panels 310, 320, a distance between a side of a first branch board 331 that is distant from the input end 136 and the input end 136 is larger than a distance between a side of a second branch board 333 that is distant from the input end 136 and the input end 136, meaning an upper end of the second branch board 333 is located lower than an upper end of the first branch board 331; and similarly, a first input end 134 is located higher than a second input end 134.

Fourth Embodiment

Figure 8:
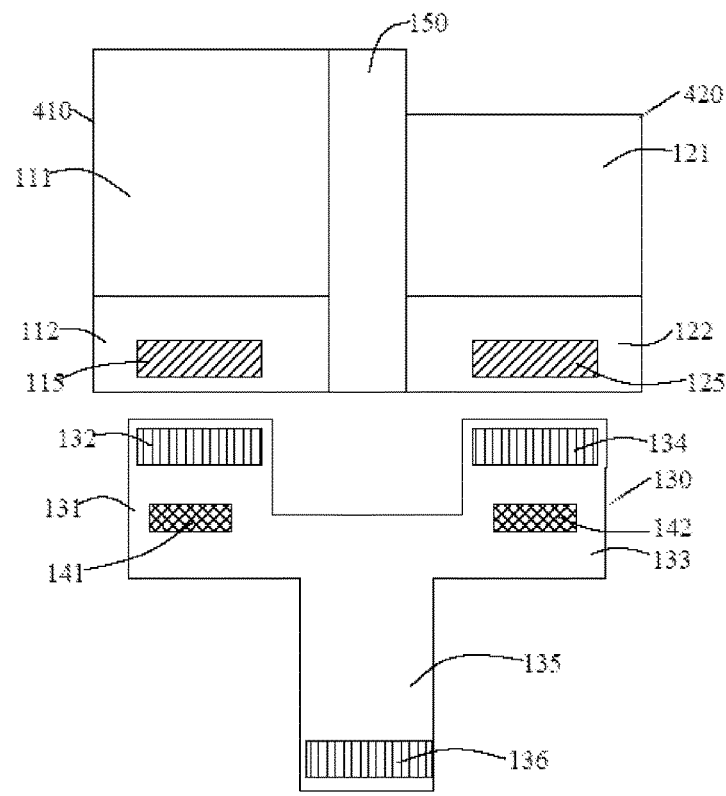
FIG. 8 is a developed plan view of a dual-sided display device according to a fourth embodiment of the present invention.

FIG. 8 shows a dual-sided display device provided according to a fourth embodiment of the present invention. FIG. 8 provides a structure that is similar to that illustrated in FIG. 1 and thus, similar parts are designated with same reference characters. A major difference of the instant embodiment from the first embodiment is that an upper side of a first display panel and an upper side of a second display panel are not arranged substantially flush with each other.

In the instant embodiment, as shown in FIG. 8, an upper side of a first display panel 410 and an upper side of a second display panel 420 are not substantially flush with each other. Here, the upper side of the first display panel 410 is located higher than the upper side of the second display panel 420.

Fifth Embodiment

Figure 9:
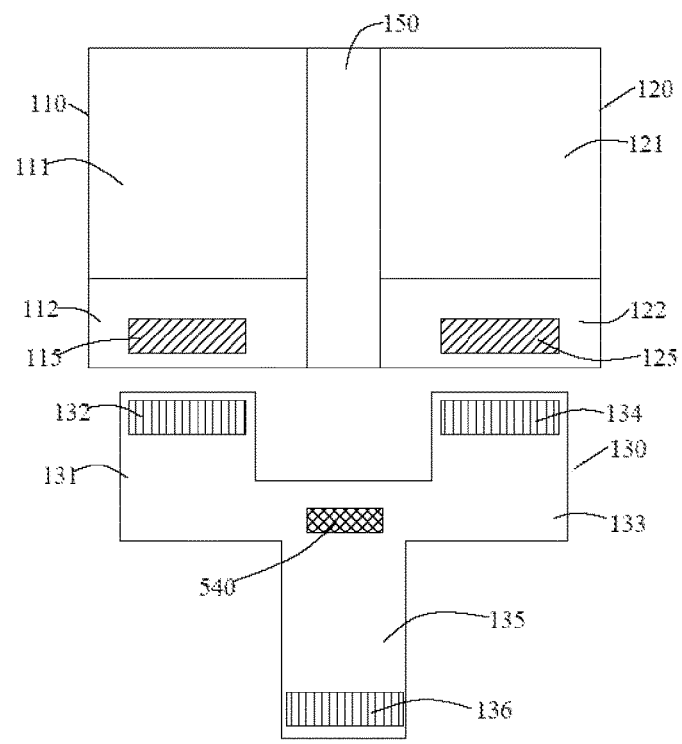
FIG. 9 is a developed plan view of a dual-sided display device according to a fifth embodiment of the present invention.

FIG. 9 shows a dual-sided display device provided according to a fifth embodiment of the present invention. FIG. 9 provides a structure that is similar to that illustrated in FIG. 1 and thus, similar parts are designated with same reference characters. A major difference of the instant embodiment from the first embodiment is that only one driver chip is required.

In the instant embodiment, as shown in FIG. 9, a first driver chip and a second driver chip are combined and integrated together to form a common driver chip 540. The common driver chip 540 is operable to drive a first display panel 110 and a second display panel 120. The common driver chip 540 is mounted on a first branch board 131 or a second branch board 133 or a third branch board 135 (by means of COF (Chip on Film) package), and is arranged on the third branch board 135 in the instant embodiment. Since the first driver chip and the second driver chip are combined and integrated as one single common driver chip, the cost is reduced and chip assembling is made easy.

Sixth Embodiment

Figure 10:
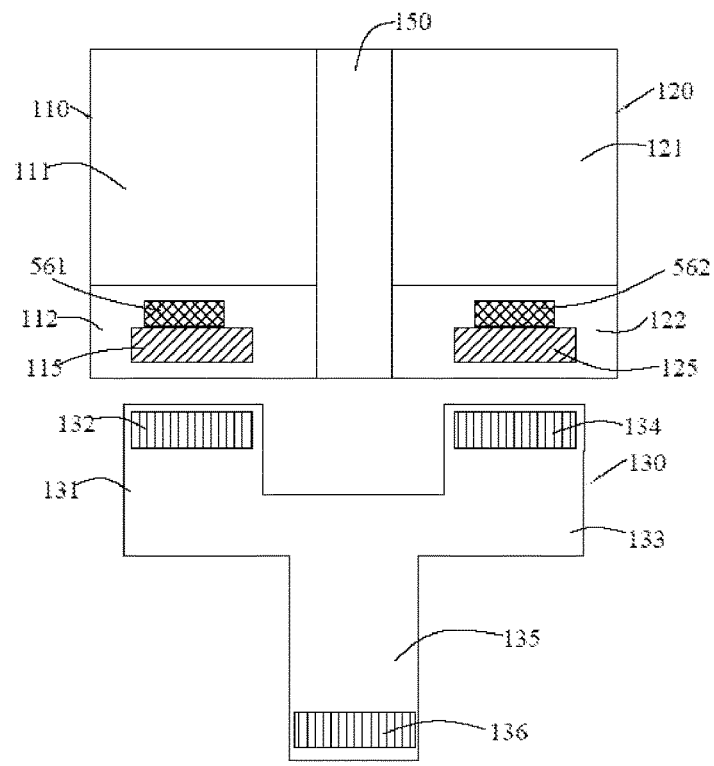
FIG. 10 is a developed plan view of a dual-sided display device according to a sixth embodiment of the present invention.

FIG. 10 shows a dual-sided display device provided according to a sixth embodiment of the present invention. FIG. 7 provides a structure that is similar to that illustrated in FIG. 1 and thus, similar parts are designated with same reference characters. A major difference of the instant embodiment from the first embodiment resides in locations of a first driver chip and a second driver chip.

In the instant embodiment, as shown in FIG. 10, a dual-sided display device comprises a first driver chip 561 and a second driver chip 562, wherein the first driver chip 561 is operable to drive a first display panel 110 and the second driver chip 562 is operable to drive a second display panel 120. The first driver chip 561 is mounted on the first display panel 110 (by means of COG (Chip on Glass) package). Here, the first driver chip 561 is arranged adjacent to a first solder pad 115. The second driver chip 562 is mounted on the second display panel 120 (by means of COG (Chip on Glass) package). Here, the second driver chip 562 is arranged adjacent to a second solder pad 125.

Seventh Embodiment

Figure 12:
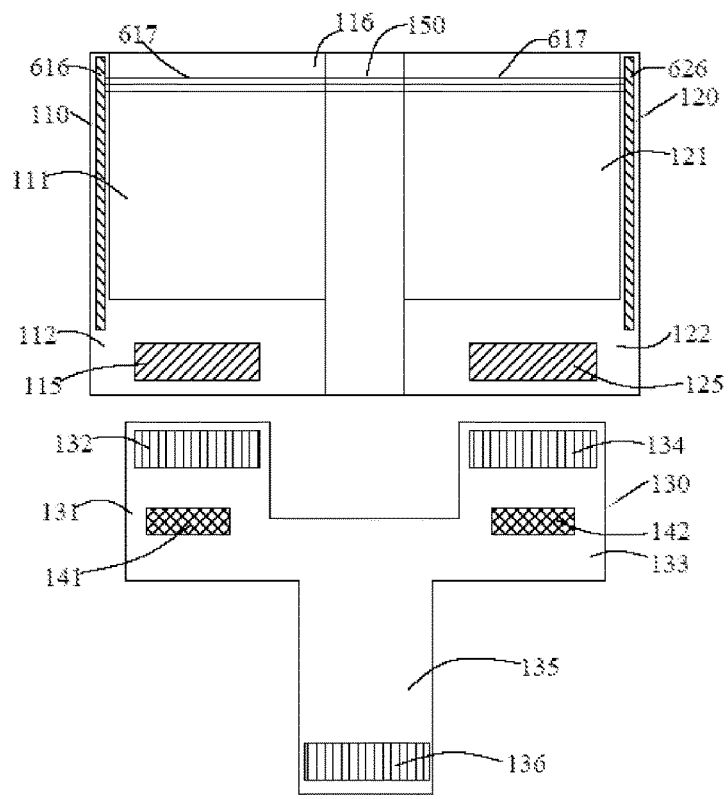
FIG. 12 is a developed plan view of a dual-sided display device according to a seventh embodiment of the present invention.

FIG. 12 shows a dual-sided display device provided according to a seventh embodiment of the present invention. FIG. 12 provides a structure that is similar to that illustrated in FIG. 1 and thus, similar parts are designated with same reference characters. A major difference of the instant embodiment from the first embodiment resides in quantity and locations of gate driver circuits.

In the instant embodiment, as shown in FIG. 12, the dual-sided display device comprises a first gate driver circuit 616 and a second gate driver circuit 626, wherein the first gate driver circuit 616 is operable to drive a first display panel 110 and the second gate driver circuit 626 is operable to drive a second display panel 120. The first gate driver circuit 616 is arranged on a side portion of the first display panel 110 that is distant from a bent section 150 and the second gate driver circuit 626 is arranged on a side portion of the first display panel 110 that is distant from the bent section 150. The first gate driver circuit 616 and the second gate driver circuit 626 are provided therebetween with common scan lines 617, such that the common scan lines 617 extend from the first gate driver circuit 616, through the first display panel 110, the bent section 150, and the second display panel 120, to connect with the second gate driver circuit 626. In the instant embodiment, since the number of the first gate driver circuit 616 is one and the number of the second gate driver circuit 626 is also one, the quantity of the first gate driver circuits and the second gate driver circuits can be reduced thereby lowering down the cost and also being easy for connection with the common scan lines. Further, areas of displaying zones of the first display panel 110 and the second display panel 120 can be expanded.

Eighth Embodiment

Figure 13:
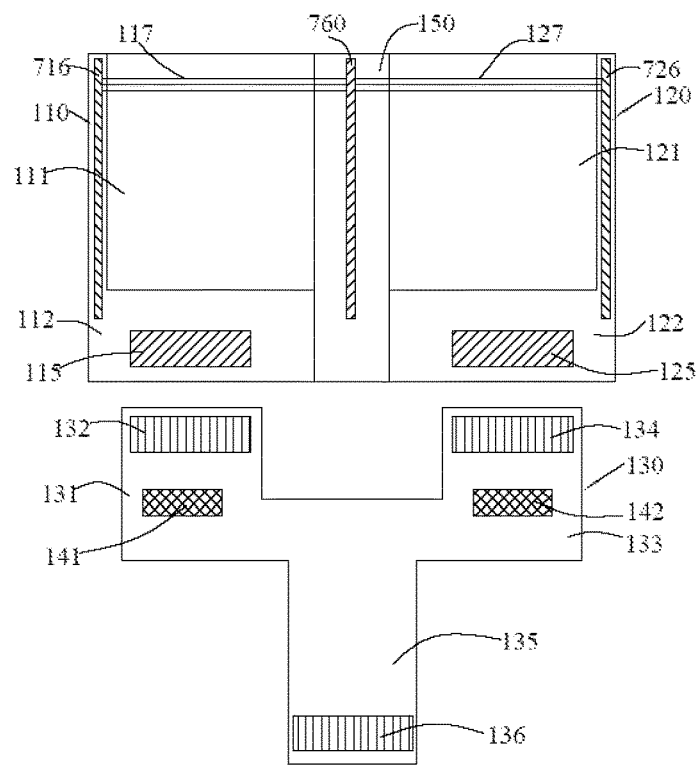
FIG. 13 is a developed plan view of a dual-sided display device according to an eighth embodiment of the present invention.

FIG. 13 shows a dual-sided display device provided according to an eighth embodiment of the present invention. FIG. 13 provides a structure that is similar to that illustrated in FIG. 1 and thus, similar parts are designated with same reference characters. A major difference of the instant embodiment from the first embodiment resides in quantity and locations of gate driver circuits.

In the instant embodiment, as shown in FIG. 13, the dual-sided display device comprises a first gate driver circuit 716 and a second gate driver circuit 726, and a common gate driver circuit 760, wherein the first gate driver circuit 716 is operable to drive a first display panel 110; the second gate driver circuit 726 is operable to drive a second display panel 120; and the common gate driver circuit 760 is operable to drive the first display panel 110 and the second display panel 120. The first gate driver circuit 716 is arranged on a side portion of the first display panel 110 that is distant from a bent section 150; the second gate driver circuit 726 is arranged on a side portion of the second display panel 110 that is distant from the bent section 150; and the common gate driver circuit 760 is arranged on the bent section 150. The first gate driver circuit 716 and the common gate driver circuit 760 are provided therebetween with first scan lines 117, and the second gate driver circuit 726 and the common gate driver circuit 760 are provided therebetween with second scan lines 127. In the instant embodiment, only three gate driver circuits are required so that cost can be saved and areas of displaying zones of the first display panel 110 and the second display panel 120 can be expanded.

Ninth Embodiment

Figure 14:
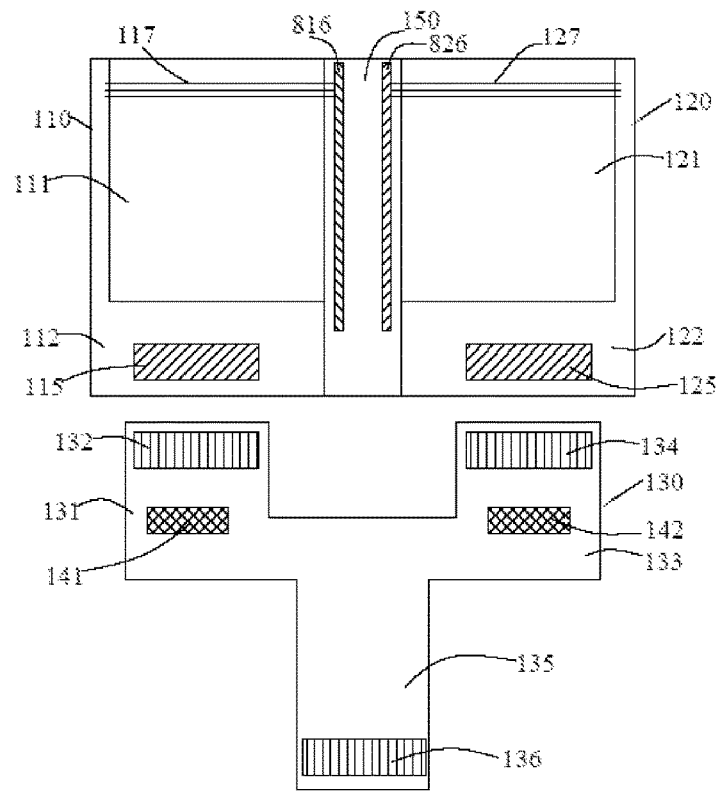
FIG. 14 is a developed plan view of a dual-sided display device according to a ninth embodiment of the present invention.

FIG. 14 shows a dual-sided display device provided according to a ninth embodiment of the present invention. FIG. 14 provides a structure that is similar to that illustrated in FIG. 1 and thus, similar parts are designated with same reference characters. A major difference of the instant embodiment from the first embodiment resides in quantity and locations of gate driver circuits.

In the instant embodiment, as shown in FIG. 14, the dual-sided display device comprises a first gate driver circuit 816 and a second gate driver circuit 826, wherein the first gate driver circuit 816 is operable to drive a first display panel 110 and the second gate driver circuit 826 is operable to drive a second display panel 120. The first gate driver circuit 816 and the second gate driver circuit 826 are both arranged on a bent section 150. One side of the first gate driver circuit 816 that is adjacent to the first display panel 110 is electrically connected with first scan lines 117 and one side of the second gate driver circuit 826 that is adjacent to the second display panel 120 is electrically connected with second scan lines 127. The first scan line 117 are arranged and lined up on the first display panel 110 and the second scan line 127 are arranged and lined up on the second display panel 120. In the instant embodiment, since only two gate driver circuits are required so that cost can be further reduced and outer frame widths of the two display panels can be reduced to thereby further expand areas of displaying zones of the first display panel 110 and the second display panel 120. Further, in other embodiments of the present invention, the first gate driver circuit may be arranged one a side portion of the first display panel that is adjacent to the bent section and the second gate driver circuit may be arranged on a side portion of the second display panel that is adjacent to the bent section.

Tenth Embodiment

Figure 15:
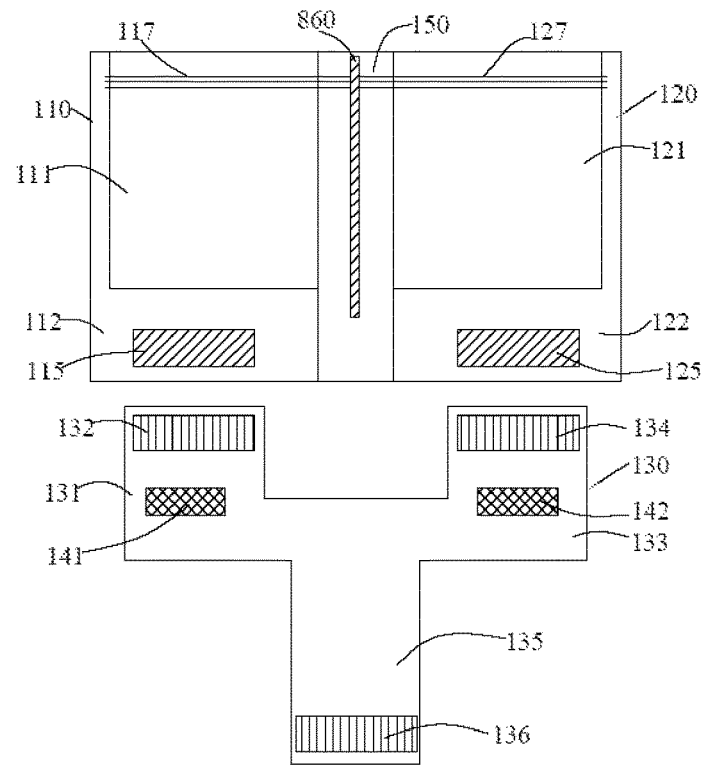
FIG. 15 is a developed plan view of a dual-sided display device according to a tenth embodiment of the present invention.

FIG. 15 shows a dual-sided display device provided according to a tenth embodiment of the present invention. FIG. 15 provides a structure that is similar to that illustrated in FIG. 1 and thus, similar parts are designated with same reference characters. A major difference of the instant embodiment from the first embodiment resides in quantity and locations of gate driver circuits.

In the instant embodiment, as shown in FIG. 15, the dual-sided display device comprises a common gate driver circuit 860. The common gate driver circuit 860 is operable to drive a first display panel 110 and a second display panel 120. The common gate driver circuit 860 is arranged on a bent section 150. Two opposite sides of the common gate driver circuit 860 are respectively and electrically connected with first scan lines 117 and second scan lines 127. The first scan lines 117 are arranged and lined up on the first display panel 110, and the second scan lines 127 are arranged and lined up on 在 the second display panel 120. In the instant embodiment, since only one gate driver circuit is required so that cost can be further reduced and outer frame widths of the two display panels can be reduced to thereby further expand areas of displaying zones of the first display panel 110 and the second display panel 120. Further, in other embodiments of the present invention, the common gate driver circuit may be arranged on a side portion of the first display panel that is adjacent to the bent section or the common gate driver circuit may be arranged on a side portion of the second display panel that is adjacent to the bent section.

It is noted that the embodiments provided in this specification are described in a progressive manner, where a major feature of each of the embodiments that is different from other embodiments is described, while other features that are similar to those of other embodiments can be referred to such other embodiments. For device related embodiments, since they are generally similar to method related embodiment so that descriptions are made in a simpler way, but those features that are correlated could be referred to those of the method related embodiments.

Based on the descriptions provided above for the embodiments, the present invention offers the following advantages:

A dual-sided display device comprises a first display panel, a second display panel, and a flexible circuit board, wherein the first display panel and the second display panel are respectively and electrically connectable with a first output end and a second output end of the flexible circuit board to allow signals fed to the first display panel and the second display panel to be supplied through an input end of the flexible circuit board so as to simplify the connection and assembling is also made easy. Further, the dual-sided display device requires just one flexible circuit board, so that the cost can be lowered down and the assembling of the flexible circuit board is also made easy.

The above provides a disclosure related to the preferred embodiments of the present invention only and is not intended to limit the scope of the present invention. Equivalent variations made according to the appended claims of the application are considered falling within the scope covered by the present invention.

What is claimed is:

1. A dual-sided display device, comprising:
   a first display panel, which is provided on a side portion thereof with a first solder pad;
   a second display panel, which is arranged opposite to the first display panel and is provided on a side portion thereof with a second solder pad; and
   a flexible circuit board, which comprises an input end, a first output end, and a second output end, wherein the first output end is electrically connectable with the first solder pad; the second output end is electrically connectable with the second solder pad; and the input end is adapted to receive an input signal;
   wherein a bent section is arranged between the first display panel and the second display panel and having opposite ends connected to the first and second display panels, respectively, to couple the first and second display panels to each other such that the first and second display panels are movable to a state where the first and second display panels face and separate from each other;
   wherein the flexible circuit board is connected to the first and second display panels with first and second output ends thereof and the flexible circuit board is separate from the bent section that is connected between the first and second display panels, such that the first and second display panels are connected to each other by the bent section and the first and second display panels are both connected to the flexible circuit board that is separate from the bent section, each of the first and second display panels being connected to both the bent section and the flexible circuit board that are separate from each other; and wherein each of the first and second display panels has a first edge and the first edges of the first and second display panel face each other, the opposite ends of the bent section being respectively connected to the first edges of the first and second display panel, and each of the first and second display panels has a second edge that is different from the first edge, the second edges of the first and second display panel corresponding to each other, the side portions of the first and second display panels on which the first and second solder pads are formed being located along the second edges respectively, the flexible circuit board being connected to the second edges of the first and second display panels through the first output end the second output end of the flexible circuit board connected to the first and second solder pads of the first and second display panels, such that the bent section is located between the first and second display panels as being connected to the first edges of the first and second display panels that face each other, while the flexible circuit board is located at one common side of a combination of the first display panel, the second display panel, and the bent section connected between the first and second display panels, the one common side being defined by the second edges of the first and second display panels to which the flexible circuit board is connected and a periphery of the bent section extending between the first and second display panels.

2. The dual-sided display device as claimed in claim 1, wherein the flexible circuit board is configured as a Y-shape and the flexible circuit board comprises a first branch board, a second branch board, and a third branch board, the first output end being arranged on the first branch board, the second output end being arranged on the second branch board, the input end being arranged on the third branch board, the first branch board and the second branch board being both arranged on one side, while the third branch board is arranged on an opposite side.

3. The dual-sided display device as claimed in claim 2, wherein the third branch board and the first branch board are arranged on a common vertical line, or alternatively, the third branch board and the second branch board are arranged on a common vertical line, or alternatively, the third branch board is located between the first branch board and the second branch board.

4. The dual-sided display device as claimed in claim 2, wherein the side portion of the first display panel that is provided with the first solder pad and the side portion of the second display panel that is provided with the second solder pad are substantially flush with each other; a side of the first solder pad that is adjacent to the first branch board and a side of the second solder pad that is adjacent to the second branch board are substantially flush with each other; a side of the first branch board that is adjacent to the first solder pad and a side of the second branch board that is adjacent to the second solder pad are substantially flush with each other; or alternatively, the side portion of the first display panel that is provided with the first solder pad is spaced from the input end by a distance that is smaller than a distance of the side portion of the second display panel that is provided with the second solder pad from the input end; the first solder pad is spaced from the input end by a distance that is smaller than a distance of the second solder pad from the input end; a distance between a side of the first branch board that is distant from the input end and the input end is smaller than a distance between a side of the second branch board that is distant from the input end and the input end; or alternatively, the side portion of the first display panel that is provided with the first solder pad is spaced from the input end by a distance that is larger than a distance of the side portion of the second display panel that is provided with the second solder pad from the input end; the first solder pad is spaced from the input end by a distance that is larger than a distance of the second solder pad from the input end; a distance between a side of the first branch board that is distant from the input end and the input end is larger than a distance between a side of the second branch board that is distant from the input end and the input end.

5. The dual-sided display device as claimed in claim 2, wherein the dual-sided display device comprises a first driver chip and a second driver chip, the first driver chip being operable to drive the first display panel, the second driver chip being operable to drive the second display panel, the first driver chip being arranged on the first branch board, the second driver chip being arranged on the second branch board; or alternatively, the dual-sided display device comprises a common driver chip, the common driver chip being operable to drive the first display panel and the second display panel, the common driver chip being arranged on the first branch board or the second branch board or the third branch board.

6. The dual-sided display device as claimed in claim 1, wherein the dual-sided display device comprises a first driver chip and a second driver chip, the first driver chip being operable to drive the first display panel, the second driver chip being operable to drive the second display panel, the first driver chip being arranged on the first display panel, the second driver chip being arranged on the second display panel.

7. The dual-sided display device as claimed in claim 1, wherein the dual-sided display device comprises two first gate driver circuits, the two first gate driver circuits being operable to drive the first display panel, wherein one of the first gate driver circuits is arranged on the bent section and the other one of the first gate driver circuits is arranged on a side portion of the first display panel that is distant from the bent section, first scan lines being provided between the two first gate driver circuits; or alternatively, the dual-sided display device comprises two second gate driver circuits, the two second gate driver circuits being operable to drive the second display panel, wherein one of the second gate driver circuits is arranged on the bent section and the other one of the second gate driver circuits is arranged on a side portion of the first display panel that is distant from the bent section, second scan lines being provided between the two second gate driver circuits; or alternatively, the dual-sided display device comprises a first gate driver circuit and a second gate driver circuit, the first gate driver circuit being operable to drive the first display panel, the second gate driver circuit being operable to drive the second display panel, the first gate driver circuit being arranged on a side portion of the first display panel that is distant from the bent section, the second gate driver circuit being arranged on a side portion of the first display panel that is distant from the bent section, common scan lines being provided between the first gate driver circuit and the second gate driver circuit, the common scan lines extending from the first gate driver circuit through the first display panel, the bent section, and the second display panel to connect to the second gate driver circuit; or alternatively, the dual-sided display device comprises a first gate driver circuit, a second gate driver circuit, and a common gate driver circuit, the first gate driver circuit being operable to drive the first display panel, the second gate driver circuit being operable to drive the second display panel, the common gate driver circuit being operable to drive the first display panel and the second display panel, the first gate driver circuit being arranged on a side portion of the first display panel that is distant from the bent section, the second gate driver circuit being arranged on a side portion of the first display panel that is distant from the bent section, the common gate driver circuit being arranged on the bent section, first scan lines being provided between the first gate driver circuit and the common gate driver circuit, second scan line being provided between the second gate driver circuit and the common gate driver circuit; or alternatively, the dual-sided display device comprises a common gate driver circuit, the common gate driver circuit being operable to drive the first display panel and the second display panel, the common gate driver circuit being arranged on the bent section, opposite sides of the common gate driver circuit being respectively and electrically connected with first scan lines and second scan lines, the first scan lines being arranged and lined up on the first display panel, the second scan lines being arranged and lined up on the second display panel; or alternatively, the dual-sided display device comprises a first gate driver circuit and a second gate driver circuit, the first gate driver circuit being operable to drive the first display panel, the second gate driver circuit being operable to drive the second display panel, the first gate driver circuit and the second gate driver circuit being arranged on the bent section, a side of the first gate driver circuit that is adjacent to the first display panel being electrically connected with first scan lines, a side of the second gate driver circuits that is adjacent to the second display panel being electrically connected with second scan lines, the first scan lines being arranged and lined up on the first display panel, the second scan lines being arranged and lined up on the second display panel.

8. The dual-sided display device as claimed in claim 1, wherein the bent section, the first display panel, the second display panel share one common flexible substrate; or alternatively, the first display panel comprises a first substrate; the second display panel comprises a second substrate; and the bent section comprises a bendable substrate, the first substrate, the second substrate, and the bendable substrate being one common glass substrate, the glass substrate being bent in a condition of high temperature to form the first substrate, the second substrate, and the bendable substrate; or alternatively, the first display panel comprises a first substrate; the second display panel comprises a second substrate; the bent section comprises a bendable substrate, the first substrate and the second substrate being glass substrates, the bendable substrate being a flexible substrate, the flexible substrate being bent to connect with the first substrate and the second substrate.

9. An application terminal device, comprising a dual-sided display device, wherein the dual-sided display device comprises:

a first display panel, which is provided on a side portion thereof with a first solder pad;

a second display panel, which is arranged opposite to the first display panel and is provided on a side portion thereof with a second solder pad; and a flexible circuit board, which comprises an input end, a first output end, and a second output end, wherein the first output end is electrically connectable with the first solder pad; the second output end is electrically connectable with the second solder pad; and the input end is provided to receive an input signal;

wherein a bent section is arranged between the first display panel and the second display panel and having opposite ends connected to the first and second display panels, respectively, to couple the first and second display panels to each other such that the first and second display panels are movable to a state where the first and second display panels face and separate from each other;

wherein the flexible circuit board is connected to the first and second display panels with first and second output ends thereof and the flexible circuit board is separate from the bent section that is connected between the first and second display panels, such that the first and second display panels are connected to each other by the bent section and the first and second display panels are both connected to the flexible circuit board that is separate from the bent section, each of the first and second display panels being connected to both the bent section and the flexible circuit board that are separate from each other; and wherein each of the first and second display panels has a first edge and the first edges of the first and second display panel face each other, the opposite ends of the bent section being respectively connected to the first edges of the first and second display panel, and each of the first and second display panels has a second edge that is different from the first edge, the second edges of the first and second display panel corresponding to each other, the side portions of the first and second display panels on which the first and second solder pads are formed being located along the second edges respectively, the flexible circuit board being connected to the second edges of the first and second display panels through the first output end the second output end of the flexible circuit board connected to the first and second solder pads of the first and second display panels, such that the bent section is located between the first and second display panels as being connected to the first edges of the first and second display panels that face each other, while the flexible circuit board is located at one common side of a combination of the first display panel, the second display panel, and the bent section connected between the first and second display panels, the one common side being defined by the second edges of the first and second display panels to which the flexible circuit board is connected and a periphery of the bent section extending between the first and second display panels.

10. The application terminal device as claimed in claim 9, wherein the flexible circuit board is configured as a Y-shape and the flexible circuit board comprises a first branch board, a second branch board, and a third branch board, the first output end being arranged on the first branch board, the second output end being arranged on the second branch board, the input end being arranged on the third branch board, the first branch board and the second branch board being arranged on one side, while the third branch board is arranged on an opposite side.

11. The application terminal device as claimed in claim 10, wherein the third branch board and the first branch board are arranged on a common vertical line, or alternatively, the third branch board and the second branch board are arranged on a common vertical line, or alternatively, the third branch board is located between the first branch board and the second branch board.

12. The application terminal device as claimed in claim 10, wherein the side portion of the first display panel that is provided with the first solder pad and the side portion of the second display panel that is provided with the second solder pad are substantially flush with each other; a side of the first solder pad that is adjacent to the first branch board and a side of the second solder pad that is adjacent to the second branch board are substantially flush with each other; a side of the first branch board that is adjacent to the first solder pad and a side of the second branch board that is adjacent to the second solder pad are substantially flush with each other; or alternatively, the side portion of the first display panel that is provided with the first solder pad is spaced from the input end by a distance that is smaller than a distance of the side portion of the second display panel that is provided with the second solder pad from the input end; the first solder pad is spaced from the input end by a distance that is smaller than a distance of the second solder pad from the input end; a distance between a side of the first branch board that is distant from the input end and the input end is smaller than a distance between a side of the second branch board that is distant from the input end and the input end; or alternatively, the side portion of the first display panel that is provided with the first solder pad is spaced from the input end by a distance that is larger than a distance of the side portion of the second display panel that is provided with the second solder pad from the input end; the first solder pad is spaced from the input end by a distance that is larger than a distance of the second solder pad from the input end; a distance between a side of the first branch board that is distant from the input end and the input end is larger than a distance between a side of the second branch board that is distant from the input end and the input end.

13. The application terminal device as claimed in claim 10, wherein the dual-sided display device comprises a first driver chip and a second driver chip, the first driver chip being operable to drive the first display panel, the second driver chip being operable to drive the second display panel, the first driver chip being arranged on the first branch board, the second driver chip being arranged on the second branch board; or alternatively, the dual-sided display device comprises a common driver chip, the common driver chip being operable to drive the first display panel and the second display panel, the common driver chip being arranged on the first branch board or the second branch board or the third branch board.

14. The application terminal device as claimed in claim 9, wherein the dual-sided display device comprises a first driver chip and a second driver chip, the first driver chip being operable to drive the first display panel, the second driver chip being operable to drive the second display panel, the first driver chip being arranged on the first display panel, the second driver chip being arranged on the second display panel.

15. The application terminal device as claimed in claim 9, wherein the dual-sided display device comprises two first gate driver circuits, the two first gate driver circuits being operable to drive the first display panel, wherein one of the first gate driver circuits is arranged on the bent section and the other one of the first gate driver circuits is arranged on a side portion of the first display panel that is distant from the bent section, first scan lines being provided between the two first gate driver circuits; or alternatively, the dual-sided display device comprises two second gate driver circuits, the two second gate driver circuits being operable to drive the second display panel, wherein one of the second gate driver circuits is arranged on the bent section and the other one of the second gate driver circuits is arranged on a side portion of the first display panel that is distant from the bent section, second scan lines being provided between the two second gate driver circuits; or alternatively, the dual-sided display device comprises a first gate driver circuit and a second gate driver circuit, the first gate driver circuit being operable to drive the first display panel, the second gate driver circuit being operable to drive the second display panel, the first gate driver circuit being arranged on a side portion of the first display panel that is distant from the bent section, the second gate driver circuit being arranged on a side portion of the first display panel that is distant from the bent section, common scan lines being provided between the first gate driver circuit and the second gate driver circuit, the common scan lines extending from the first gate driver circuit through the first display panel, the bent section, and the second display panel to connect to the second gate driver circuit; or alternatively, the dual-sided display device comprises a first gate driver circuit, a second gate driver circuit, and a common gate driver circuit, the first gate driver circuit being operable to drive the first display panel, the second gate driver circuit being operable to drive the second display panel, the common gate driver circuit being operable to drive the first display panel and the second display panel, the first gate driver circuit being arranged on a side portion of the first display panel that is distant from the bent section, the second gate driver circuit being arranged on a side portion of the first display panel that is distant from the bent section, the common gate driver circuit being arranged on the bent section, first scan lines being provided between the first gate driver circuit and the common gate driver circuit, second scan line being provided between the second gate driver circuit and the common gate driver circuit; or alternatively, the dual-sided display device comprises a common gate driver circuit, the common gate driver circuit being operable to drive the first display panel and the second display panel, the common gate driver circuit being arranged on the bent section, opposite sides of the common gate driver circuit being respectively and electrically connected with first scan lines and second scan lines, the first scan lines being arranged and lined up on the first display panel, the second scan lines being arranged and lined up on the second display panel; or alternatively, the dual-sided display device comprises a first gate driver circuit and a second gate driver circuit, the first gate driver circuit being operable to drive the first display panel, the second gate driver circuit being operable to drive the second display panel, the first gate driver circuit and the second gate driver circuit being arranged on the bent section, a side of the first gate driver circuit that is adjacent to the first display panel being electrically connected with first scan lines, a side of the second gate driver circuits that is adjacent to the second display panel being electrically connected with second scan lines, the first scan lines being arranged and lined up on the first display panel, the second scan lines being arranged and lined up on the second display panel.

16. The application terminal device as claimed in claim 9, wherein the bent section, the first display panel, the second display panel share one common flexible substrate; or alternatively, the first display panel comprises a first substrate; the second display panel comprises a second substrate; and the bent section comprises a bendable substrate, the first substrate, the second substrate, and the bendable substrate being one common glass substrate, the glass substrate being bent in a condition of high temperature to form the first substrate, the second substrate, and the bendable substrate; or alternatively, the first display panel comprises a first substrate; the second display panel comprises a second substrate; the bent section comprises a bendable substrate, the first substrate and the second substrate being glass substrates, the bendable substrate being a flexible substrate, the flexible substrate being bent to connect with the first substrate and the second substrate.

\* \* \* \* \*